Feb. 24, 1970   J. L. SITOMER   3,496,781
GYROSCOPIC OUTPUT AXIS TORQUE COMPENSATION APPARATUS
Filed Sept. 25, 1967   2 Sheets-Sheet 1

INVENTOR:
JAMES L. SITOMER
BY
ATTORNEY 3,496,781
GYROSCOPIC OUTPUT AXIS TORQUE
COMPENSATION APPARATUS
James L. Sitomer, Middleton, Mass., assignor to Massachusetts Institute of Technology, Cambridge, Mass., a corporation of Massachusetts
Filed Sept. 25, 1967, Ser. No. 670,334
Int. Cl. G01c 19/04
U.S. Cl. 74—5.34
15 Claims

ABSTRACT OF THE DISCLOSURE

An improved apparatus for compensating error due to output axis torque caused by output axis accelerations in single-degree-of-freedom gyroscopes in an angular measuring unit, particularly in a gimballess inertial navigation system. Three system gyroscopes are mounted rigidly to the frame of an incorporating vehicle such that the output axis of each gyro is parallel to the spin reference axis of one of the other gyros. Angular acceleration about the output axis of one gyro, causing an erroneous output axis torquing signal, is also sensed as rotation about the spin reference axis of a second gyro. A measure of this rotation about the spin reference axis is provided by a pulsed rebalancing suspension system incorporated in each gyro. The resulting erroneous signal from the first gyro is compensated by comparing the output of the first gyro with the output of the second gyro's pulsed rebalancing system. The two signals are scaled and mixed to remove the error due to output axis torque. The output axis torque within the second and third gyros in the system is compensated in a similar fashion.

---

The invention herein described was made in the course of work performed under a contract with the United States Naval Ordance Systems Command, Department of the Navy.

BACKGROUND OF THE INVENTION

Field of the invention

This invention relates generally to angular measuring units, particularly to gimballess inertial navigation systems, and more specifically to an improved apparatus for compensating for the output axis torque error due to angular accelerations about the output axes of the single-degree-of-freedom gyroscopes of such systems.

Description of the prior art

Torque is generated about the output axis of a single-degree-of-freedom gyroscope when the gyro's float rotates with respect to its case. Ideally, this occurs only in response to an angular velocity applied about the gyro's input axis. The attendant rotation of the float, in turn, is sensed by the gyro's signal generator (SG), and a restoring torque is developed by the gyro's torque generator (TG) which is coupled to the signal generator via a servo feedback loop. A measure of this torque, in turn, provides the basis for computing angular velocity about the gyro's input axis according to the basic equation:

$$T_{OA} = \omega_{IA} H$$

where $T_{OA}$ is the torque about the gyro's output axis, $\omega_{IA}$ is the angular velocity applied about the input axis, and $H$ is the angular momentum of the gyro's wheel.

In practice, however, a gyroscope is subjected to many other sources of disturbing torque, both internal and external to the gyro, which result in an erroneous output from the SG–TG servo feedback loop. By proper design and construction, many of these error sources can be reduced to a degree where they do not seriously limit the gyro accuracy.

In a gimballess or strapped-down inertial navigation system, employing three single-degree-of-freedom system gyroscopes, a primary source of gyro error is that due to output axis torque. The gimballess system is particularly susceptible to this type of error, since in this configuration, the three gyroscopes are typically mounted rigidly to the frame of the incorporating vehicle. Hence, the gyros are particularly sensitive to rotations of the vehicle's base. Base motion may be such as to impart both a component of angular velocity about the gyro's input axis (IA) and simultaneously a component of acceleration about its output axis (OA). Since angular acceleration about a gyro's output axis and angular velocity about its input axis produce like inertial effects, the gyro's computing system, i.e., servo feedback loop, being responsive to both inertial effects, is not directly related to the angular velocity applied about the input axis. That is, the total restoring torque generated via the feedback loop may comprise a component representing a measure of angular acceleration about OA as well as a component representing angular velocity about IA. Consequently, the indicated angular velocity about the gyro's input axis is always subject to error.

One presently used technique for minimizing the effects of the aforementioned output axis error torque is through digital computation and compensation of rate information. This particular scheme is presently being implemented, for example, in the so-called M.I.T. Pulsed Inertial Reference Integrating Gyroscope (PIRIG).

The PIRIG is essentially the standard single-degree-of-freedom floated inertial reference integrating gyroscope described between pages 103 and 111 of Inertial Guidance, by C. Draper, W. Wrigley and J. Hovorka, Pergamon Press, 1960, with the incorporation of pulse torquing electronics in the servo feedback loop. (Reference is also made to this work for a description of basic gyroscopic theory including a development of the basic equations of motion therefor). In this instrument, the float is suspended in two radial and one axial dimension via a standard magnetic suspension system employing ducosyns and operated as a linear, AC excited, series-tuned variable reluctance magnetic device. The suspension axes are rotated 45 degrees with respect to the input-spin reference axes of the PIRIG. The pulse torquing electronics, employed in the servo feedback loop between the signal generator and torque generator, is similar to that used in other pulsed instruments. It typically comprises a three-level electronic relay, a combination sampler and hold unit, and a timing circuit. The output current of the signal generator, representing the error signal, is sampled at discrete time intervals rather than continuously. Further, the torque generator is activated only at discrete time intervals and only if the amplitude of the error signal exceeds a predetermined threshold value. The input current to the torque generator is in the form of pulses of fixed magnitude and duration. Standard indicating apparatus provides a readout of the pulses of drive current from the feedback loop. Gyroscopes employing pulse torquing loops of this type are sometimes designated in the literature as delta modulated instruments.

The output axis torque compensation scheme as presently implemented in the PIRIG and other like instruments is basically as follows. The three system gyroscopes are mounted on the base such that the input axis of each gyro coincides with an axis of the base (the base having three mutually orthogonal axes $X_B$, $Y_B$, $Z_B$), and the output axis of each gyro is parallel to the input axis of one of the other gyros. Motion of the base about the output axis of gyro No. 1 causes a signal to be generated via that gyro's pulse torquing loop. This signal represents a component of output axis torque and, assuming base motion also about the gyro's input axis, the signal further represents a component due to the angular velocity about the input axis. Where the gyros used are of the integrating type, the resulting output signal is in the form of quantized angle. Simultaneously, a quantized angular output is generated by gyro No. 2 whose input axis is aligned along the output axis of gyro No. 1. This second output, in turn, represents the component of output axis torque applied about gyro No. 1. The output of gyro No. 1 is fed directly into a counter in the transformation computer. The output of gyro No. 2 is first differentiated so as to produce rate information and is then compared in the counter with the quantized angular output of gyro No. 1. The output of gyro No. 2, representing the component of output axis torque applied about gyro No. 1, is subtracted from the total output of gyro No. 1. The resulting difference signal represents only the component of angular velocity applied about the input axis of gyro No. 1. Since the output axis of gyro No. 2 is aligned parallel with the input axis of gyro No. 3, and since the output axis of gyro No. 3 is aligned parallel with the input axis of gyro No. 1, the effects of output axis torque about gyros Nos. 2 and 3 are compensated according to the identical procedure described above.

The major disadvantage of the aforementioned compensation scheme lies in the fact that it is bandwidth limited due to the finite time necessary to compute rate information from angular information. Since the output of the gyro representing the compensation signal must first be differentiated prior to its comparison in the counter with the output of the gyro to be compensated, a measurable time lag exists between the two signals. The compensation, in other words, continually lags behind the error-producing torque, giving rise to errors in the compensation itself. A second disadvantage of the aforementioned compensation scheme lies in the errors produced in the output axis indication of the compensating gyro due to the various dynamic effects operating on the gyro.

SUMMARY OF THE INVENTION

In view of the above described limitations of presently available output axis torque compensation apparatus, applicant has as the primary object of his invention to improve the accuracy and speed of such compensation and to increase the bandwidth thereof.

It is another object of the invention to provide an output axis torque compensation apparatus having a minimum of components.

It is another object of the invention to provide a compensation apparatus that produces a precise, measurable indication of the output axis error torque acting on a gyroscope.

It is another object of the invention to provide an output axis torque compensation apparatus of reduced cost and complexity.

These and other objects are met by a compensation apparatus comprising three single-degree-of-freedom floated pulsed integrating gyroscopes, each having mutually orthogonal axes designated, according to standard terminology, as an input axis (IA), an output axis (OA), and a spin reference axis (SRA). Each gyroscope incorporates a time-shared pulsed rebalancing magnetic suspension system (a type of force rebalancing feedback system), and the gyros and their suspensions are arranged in such a way as to take maximum advantage of the inherent characteristics of rotation about each gyro's spin reference axis.

According to the invention, the three system gyroscopes of an angular measuring unit, such as a gimballess inertial navigation system, are mounted on the incorporating vehicle or base such that the output axis of each group gyro is aligned parallel to the spin reference axis of another of the gyros and such that the input axis of each gyro coincides with an axis of the vehicle. (The vehicle has three mutually orthogonal axes, $X_B$, $Y_B$, $Z_B$— the purpose of the overall measuring unit being to measure rotation of the vehicle relative to a non-rotating inertial reference frame.) Angular acceleration about the OA of one gyroscope (designated gyro No. 1) causes an erroneous restoring torque to be generated by the gyro's pulse torquing electronics. As aforementioned, this torque is read out from the feedback loop in the form of quantized angular bits or pulses of fixed magnitude and duration. The component of angular acceleration applied about the output axis of gyro No. 1 is also reflected as rate about the SRA of a second gyro (gyro No. 2), whose SRA is aligned parallel with the OA of gyro No. 1, causing the float of gyro No. 2 to rotate about SRA from a center or angular null position. The pulsed rebalancing suspension system of gyro No. 2 acts to restore the float in response to this rotation. As will be explained later in the specification, the force imparted by the pulsed rebalancing suspension system to restore the float is read out directly as increments of rate, eliminating the need for a differentiating unit. Since the error in angular bits from the pulse torquing loop of gyro No. 1 is proportional to rate, the two outputs can be scaled and mixed to remove the error due to output axis torque for gyro No. 1.

Further, as will be explained, the response of the pulsed rebalancing suspension is appreciably faster than the pulse torquing loop response. By filtering the output from the pulsed rebalancing suspension of gyro No. 2, the time constants for the output signal pulses from both gyros may be exactly matched.

The direct readout of rate information afforded by the pulsed rebalancing suspension system plus the matching of the time constants of both gyros' ouptut signals act to eliminate effectively any time lag between the error producing torque and the compensation therefor. Consequently, compensation is instantaneous, and the bandwidth of the compensation scheme is substantially increased to match the bandwidth of gyro No. 1.

The application of output axis torque to gyros No. 2 and No. 3 in the system is compensated in precisely the same manner as that indicated above, since as previously stated, the output axis of each of the system gyros will be aligned parallel with the spin reference axis of one of the other gyros.

DRAWINGS

PREFERRED EMBODIMENT

Figure 1:
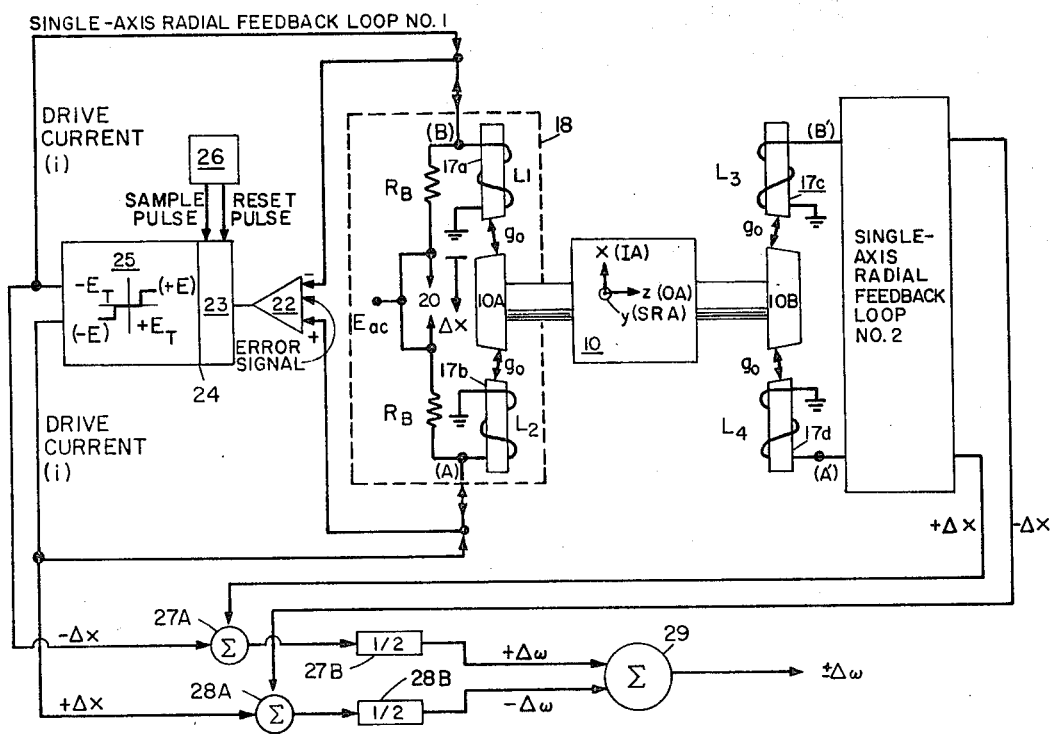
FIG. 1 is a block diagram of a single-axis pulsed rebalancing suspension system incorporated in the gyroscopes utilized with subject invention, and suspending the gyroscope's float radially about the gyro's spin reference axis.

In order to provide a foundation for better understanding the invention, the simplified equations of motion for torque about a single-degree-of-freedom gyroscope's output and spin reference axes will be briefly reviewed. A detailed analysis of these equations can be found in the literature of gyroscopes. See, for example, pages 3–1 through 3–5 of Single-Degree-of-Freedom Gyroscopes, by W. Wrigley, M.I.T. Instrumentation Laboratory Report No. R–375, July, 1962. Since, as previously mentioned, the gyroscopes used in the invention incorporate time-shared pulsed rebalancing magnetic suspension systems, the suspension will also be briefly described. The basic principles and detailed description of this suspension system are found in co-pending application Ser. No. 626,199 by James L. Sitomer and Michael D. Leis.

(1) Simplified equations of motion

The simplified equation of motion for torque about the output axis (OA) of a gyroscope is:

$$I_{OA}\ddot{A}_{fc} + C_{OA}\dot{A}_{fc} = -I_{OA}\dot{\omega}_{OA} + H\omega_{IA} + M_{tg} \quad (1)$$

where:

$A_{fc}$ is the angle of the float with respect to the gyro's case about the gyro's output axis (OA);
$I_{OA}$ is the inertia about OA;
$C_{OA}$ is the damping coefficient about OA;
$\omega_{OA}$ is the angular rate about OA;
$\omega_{IA}$ is the "angular rate" about the gyro's input axis (IA);
H is the angular momentum of the gyro's wheel;
$M_{tg}$ is the torque generator supplied by the pulse torquing loop;
a single dot (·) over a symbol indicates a first derivative while two dots (··) indicate a second derivative.

Integrating Equation 1 once, realizing that $M_{tg}$ is quantized, and solving for this integrated (or summed) torque yields:

$$\frac{1}{H}\sum_n M_{0,tg}\Delta T_1 = -\theta_{IA} + \frac{I_{OA}}{H}\omega_{OA} + \frac{C_{OA}}{H}\left[\frac{I_{OA}}{C_{OA}}\dot{A}_{fc} + A_{fc}\right] \quad (2)$$

where:

$M_{0,tg}$ is the magnitude of $M_{tg}$, and
$\Delta T_1$ is the width of $M_{tg}$.

The first term on the right of Equation 2 is the integrated rate about OA; the second term is the error term due to the output axis rotation; the third term is referred to as the storage or dynamic error of the gyro. The term on the left is the net sum of pulses ($n$) which is the indicated output of the instrument, as supplied by its pulse torquing loop. Ideally:

$$\frac{1}{H}\sum_n M_0\Delta T = -\theta_{IA} \quad (2a)$$

the remaining two terms being the error. The storage is the dynamic lag of the gyro with $$\tau_{OA} = \frac{I_{OA}}{C_{OA}}$$

Note that in the present application, the storage error term is not compensated.

The simplified equation of motion for torque about the spin reference axis (SRA) of a gyroscope is:

$$I_{SRA}\ddot{A}_{SRA} + C_{SRA}\dot{A}_{SRA} = -I_{SRA}\dot{\omega}_{SRA} + M_{SRA} \quad (3)$$

where the terms of Equation 3 are similar to 1 with the subscripts being replaced. Note that the angular momentum vector, H, does not operate in this equation.

Integrating Equation 3 and again realizing that $M_{SRA}$ is quantized:

$$\frac{1}{I_{SRA}}\sum_n M_{0,SRA}\Delta T_2 = \omega_{SRA} + \frac{C_{SRA}}{I_{SRA}}\left[\frac{I_{SRA}}{C_{SRA}}\ddot{A}_{SRA} + A_{SRA}\right] \quad (4)$$

Note the similarity of Equation 4 to Equation 2. Here the indicated output, as generated by the pulsed rebalancing suspension system, is a measure of the rate about SRA. The storage about this axis is the second term on the right with $$\tau_{SRA} = \frac{I_{SRA}}{C_{SRA}}$$

In general, for single-degree-of-freedom integrating gyros, $\tau_{SRA} \ll \tau_{OA}$.

Define:

$$\frac{1}{H}M_{0,tg}\Delta T_1 = \theta_{IA} \quad (5)$$

$$\frac{I_{OA}}{I_{SRA}}\frac{1}{H}M_{0,SRA}\Delta T_2 = \frac{I_{OA}}{H}\Delta\omega_{SRA}$$

For simplicity of the scheme, although not a necessity, let $$\Delta\theta_{IA} = \frac{I_{OA}}{H}\Delta\omega_{SRA} \quad (6)$$

then $$M_{0,tg}\Delta T_1 = \frac{I_{OA}}{I_{SRA}}M_{0,SRA}\Delta T_2$$

In order to analyze Equation 6, the factors determining the various constraints should be examined. $M_{0,tg}$ is determined by the maximum rate sensed by the gyro about its input axis, such that $M_{0,tg} = H\omega_{IA,max}$. As noted previously, in the present PIRIG, the suspension system is oriented 45 degrees with respect to the gyro's IA–SRA axes. Consequently, for the gyro to sustain rates about its output axis of the same magnitude as the rate about its input axis (a normal constraint in most systems), $$M_{0,SRA} = \frac{\sqrt{2}}{2}H\omega_{IA,max}$$

Then, solving for $\Delta T_2$ in Equation 6 yields:

$$\Delta T_2 = \sqrt{2}\frac{I_{SRA}}{I_{OA}}\Delta T_1 \quad (7)$$

For most gyros, this means that the sampling frequency of the gyro's pulsed rebalancing suspension will be of the same order of magnitude as that of its pulse torquing system.

By rotating the suspension system an additional 45 degrees such that the suspension's x and y axes are aligned with the gyro's IA and SRA, respectively, the magnitude of the restoring torque about SRA need be $$M_{0,SRA} = I_{SRA}\dot{\omega}_{SRA}$$

In general $$I_{SRA}\dot{\omega}_{SRA} \ll H\omega_{IA}$$

so that $\Delta T_2$ can be reduced to a lower value.

As an example, if $$\frac{I_{OA}}{H} = 10^{-3}$$

$\omega_{OA} = 1$ rad./sec., and $\Delta\theta_{IA} = 33.3 \times 10^{-6}$ radians, then the total error is 30 pulses. If $\omega_{OA}$ is limited in its rate of change so that the angular acceleration is constant and achieves 1 rad./sec. in 0.1 second, then the error pulses arrive at a rate .1/30 = 3.33 millisec. For these constants, if $\omega_{IA,max} = 1$ rad./sec., then $\Delta T_1 = 33.3 \times 10^{-6}$ sec. and if $\Delta T_2 = 3.33$ millisec for maximum matching, then $$\frac{\Delta T_2}{\Delta T_1} = 1000$$

The choice of $M_{0,SRA}$ is then predicated on the vehicle accelerations rather than on the maximum rate sensed by the gyro about its input axis.

(2) Pulsed rebalancing magnetic suspension system

Referring to FIG. 1, float 10 is shown coupled to end masses or rotors 10A and 10B, the entire assembly being centered such that the z axis of the float substantially coincides with the gyro's output axis when the assembly is non-rotating about its y axis (which coincides with the gyro's SRA). Further, the x axis of the float coincides with the gyro's IA. End masses 10A and 10B are magnetically suspended about the gyro's SRA via the two single-axis radial feedback loops which together comprise the pulsed rebalancing magnetic suspension system. To better aid in understanding the suspension system as used in the present invention, a brief description of feedback loop No. 1 is given. It is noted that feedback loop No. 2 is identical thereto.

Feedback loop No. 1 comprises electromagnet transducer 18 having complementary poles or electromagnets symmetrically disposed about mass 10A, difference amplifier 22, timing circuit 26, and electronic apparatus 24 including sampler 23, a three-level electronic relay 25, and associated logic circuitry. The electromagnets are excited by an AC resistance bridge 20. Electronic apparatus 24 receives, through amplifier 22, the amplified error signal generated between output terminals (A) and (B) of the bridge, and also receives timing signals comprising sample and reset pulses from timing circuit 26. The output of apparatus 24 is fed back and provides DC driving current (i) to the output terminals (A) or (B) of the bridge.

Functionally, as resistors of bridge 20 have a common value $R_B$, the bridge generates a differential error voltage only when the inductances $L_1$, $L_2$ of coils 17a and 17b, respectively, are different. Such a difference is brought about by movement of mass 10A along the float's $x$ axis, designated as the reference axis. The sensitivity $\Delta e/\Delta x$ of the bridge to changes in position of mass 10A along the $x$ axis is expressed by Equation 8, as $$\frac{\Delta e}{\Delta x} = \frac{E_{ac}}{g_0} \frac{\text{volts}}{\text{cm.}} \text{ where } \frac{x}{g_0} \leq .0333 \qquad (8)$$

and $E_{ac}$ is the amplitude of the excitation voltage applied to the bridge. Because changes in deviation $\Delta x$ of the mass from its center or null position modulate the excitation voltage $E_{ac}$ to produce the differential error voltage $\Delta e$, the error voltage between output terminals (A), (B) of the bridge is a double side band suppressed carrier signal. If the incremental symbols in Equation 8 are disregarded, it is observed that the amplitude of the error signal is directly related to the amplitude of deviation $\Delta x$. Moreover, as is known to those familiar with the operation of AC inductance bridges of the kind described, the phase of the error signal between terminals (A) and (B) is also dependent on the direction of deviation $\Delta x$. That is, the phase of the error signal is shifted by 180 electrical degrees if the deviation is in the negative $\Delta x$ direction from the error signal generated when the deviation is in the positive $\Delta x$ direction.

The error signal, upon being amplified by differential amplifier 22, is coupled to sampler 23 in electronic apparatus 24. Sampler 23 performs a zero order sample and hold operation well known in the art of digital sampling, and a logic function. Specifically, if the sampled positional error is positive and greater than a threshold level ($+E_T$), a zero hold of state $+E$ is stored; but if the sampled positional error is negative and exceeds a threshold ($-E_T$), a zero order hold state $-E$ is stored. If the error is less than either threshold (relay deadband operation), a zero state is stored. Electronic switch 25 responds to the three foregoing states by applying a force restoring DC driving current to the appropriate output terminal of the bridge. Thus, if the stored state in the sampler is $+E$, a DC driving current is applied to terminal (B) for a defined period, thereby increasing the stored energy in the air gap and causing a negative force (in the negative $\Delta x$ direction) to be exerted on mass 10A. Conversely, if the stored state is $-E$, a DC driving current is applied to terminal (A) for the defined period, and the mass is forced in the plus $\Delta x$ direction. Storage of state zero results in the application of no current to either output terminal of the bridge. Since a bridge circuit is employed, the polarities expressed are not absolute, but the terms "positive" and "negative" are used only to indicate conveniently the particular terminal to which the DC current is applied. The term "polarity" consequently refers only to relative difference in voltage.

Furthermore, operation of electronic apparatus 24 is in accord with a sequence of Sample and Reset pulses generated by timing circuit 26. The Sample pulses are in a continuous train with period $T_S$ that is a submultiple of the bridge excitation frequency, and they maintain a constant phase relationship with that excitation. For maximum sensitivity this phase is set at 90 electrical degrees, in other words, sampling occurs only when the sinusoidal excitation voltage is maximum. Each sample pulse is followed by a Reset pulse delayed by a time interval $T_R$. System operation is such that sampler 23 instantaneously samples the amplified error signal and electronic relay 25 applies driving current, if at all, only when apparatus 24 receives a Sample pulse. Upon receipt of a subsequent Reset pulse, the relay impedes the flow of any driving current to the output terminals of the bridge. Thus, driving current is applied only for the period $T_R$. The remaining interval $T_S - T_R$ (when the mass is not subject to a corrective force) is adequate to permit transients occasioned by the application of driving current to terminate.

The corrective pulses of driving current supplied to the terminals of transducer 18 are of fixed amplitude and fixed duration, and provide an indication of the force acting on the mass. The direction of mass deviation from its center or null position along the reference $x$ axis is indicated by the particular terminal to which the corrective pulses are applied.

The simple, single-axis loop described above provides only an indication of the translation of mass 10A along the reference $x$ axis. As noted previously, two such loops are needed to indicate rotation of float 10 about the spin reference axis. As shown in FIG. 1, when float 10 is centered such that its $z$ axis substantially coincides with the gyro's OA, end mass 10A is substantially centered or nulled along reference axis $x$ between coils 17a and 17b, while end mass 10B is substantially centered or nulled along reference axis $x$ between coils 17c and 17d. In this orientation, the float is substantially precluded from rotating relative to the case about the gyro's SRA.

For purposes of the present invention, the basic pulsed rebalanced suspension system has been modified with the addition of readout circuitry to both loops as will now be explained. It is also noted that throughout the description, the mutually orthogonal reference axes of the float are identical to the reference axes of the suspension system. Hence, reference to the float's $x$-$y$-$z$ axis frame also refers to the $x$-$y$-$z$ axis frame of the suspension system.

Again referring to FIG. 1, terminals A and B' are coupled to summer 28A, the output of which is coupled to divide-by-two circuit 28B; while terminals B and A' are coupled to summer 27A, whose output, in turn, is coupled to divide-by-two circuit 27B. The outputs of the two divide-by-two circuits are fed to summer 29. The summers and divide-by-two circuits are common to the digital art.

As float 10 begins to rotate in a clockwise direction about its $y$ axis (coincident with the gyro's SRA), air gap $g_0$ between mass 10A and coil 17b increases, while air gap $g_0$ between mass 10B and coil 17c also increases. Based on the aforementioned principles, corrective pulses of DC drive current are applied to terminals A and B'. These pulses are summed in summer 28A, the difference signal is divided by divide-by-two circuit 28B, and the resulting output signal ($-\Delta \omega$) is fed to summer 29. Since rotation in this instance is clockwise, no output is generated by summer 27A or its divide-by-two circuit. Hence, the output of summer 29 will be a signal ($-\Delta \omega$) indicating direction and rate of rotation of float 10. (Since the corrective pulse inputs to summer 27A do not necessarily occur simultaneously, proper scaling is also afforded by the divide-by-two circuit.)

Conversely, if float 10 rotates in a counterclockwise direction about its $y$ axis, corrective pulses of DC drive current are applied to terminals B and A'. These pulses are summed in summer 27A, the difference signal divided by divide-by-two circuit 27B, and the resulting output signal ($+\Delta\omega$) is fed to summer 29. Since, in this case, no output is generated by summer 28A or its divide-by-two circuit, the output of summer 29 will be a signal ($+\Delta\omega$) indicating direction and rotation of float 10.

Summer 29 is necessary to prevent an erroneous indication of float rotation when, in fact, the float is only translating. For example, assuming float 10 translates along the reference $x$ axis in the $-\Delta x$ direction, corrective pulses of DC drive current are applied to terminals A and A′, causing an input to summers 28A and 27A, respectively. The output of divide-by-two circuit 28B indicates a rate of rotation ($-\Delta\omega$) in the clockwise direction, while the output of divide-by-two circuit 27B indicates a rate of rotation ($+\Delta\omega$) in the counterclockwise direction, although in fact no rotation occurred. By summing both outputs in summer 29, however, the signals cancel each other, and no output is generated by summer 29. (Indications of translation only are provided by additional circuitry not shown here since this is not within the scope of the present invention.)

(3) Description of the invention

Figure 2:
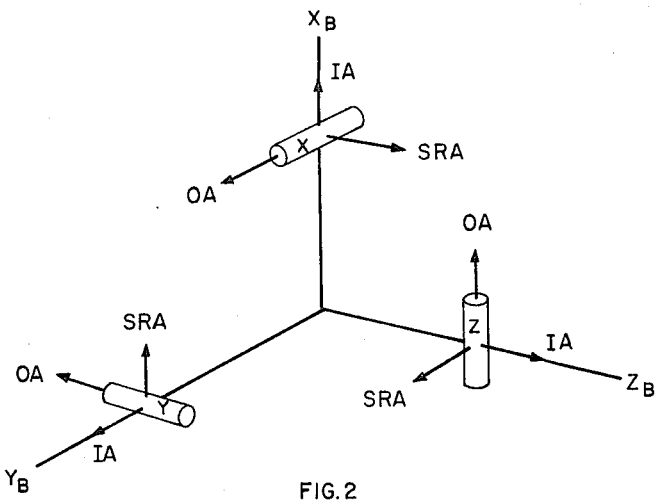
FIG. 2 is a vector diagram showing the alignment of the three system gyroscopes relative to each other and to the reference frame of the incorporating vehicle in accordance with the invention.

According to the invention, the three system gyroscopes, designated as X, Y, and Z are mounted on the incorporating vehicle or base such that the input axis of each gyroscope constitutes an axis of the vehicle's coordinate reference frame and further such that the output axis of each gyro is aligned parallel to the spin reference axis of one of the other gyros. As noted in FIG. 2, aligned along the X axis of the base is the input axis (IA) of the X gyro, the spin reference axis (SRA) of the Y gyro, and the output axis (OA) of the Z gyro; aligned along the Y axis of the base is the IA of the Y gyro, the OA of the X gyro an the SRA of the Z gyro; similarly, aligned along the Z axis of the base is the IA of the Z gyro, the OA of the Y gyro, and the SRA of the X gyro.

In the preferred embodiment, the gyros are single-degree-of-freedom PIRIG's with the incorporation of the above described pulsed rebalancing suspension system for float suspension about the spin reference axis. As aforementioned, the suspension system is oriented relative to the gyro's IA–SRA axes shown that the coils for both loops are in the gyro's IA plane (shown in FIG. 1 as the suspension's reference $x$ axis) and orthogonal to its SRA (shown in FIG. 1 as the suspension's $y$ axis), thereby appreciably reducing the magnitude of the restoring torque about SRA and further allowing a lower clock rate.

Figure 3:
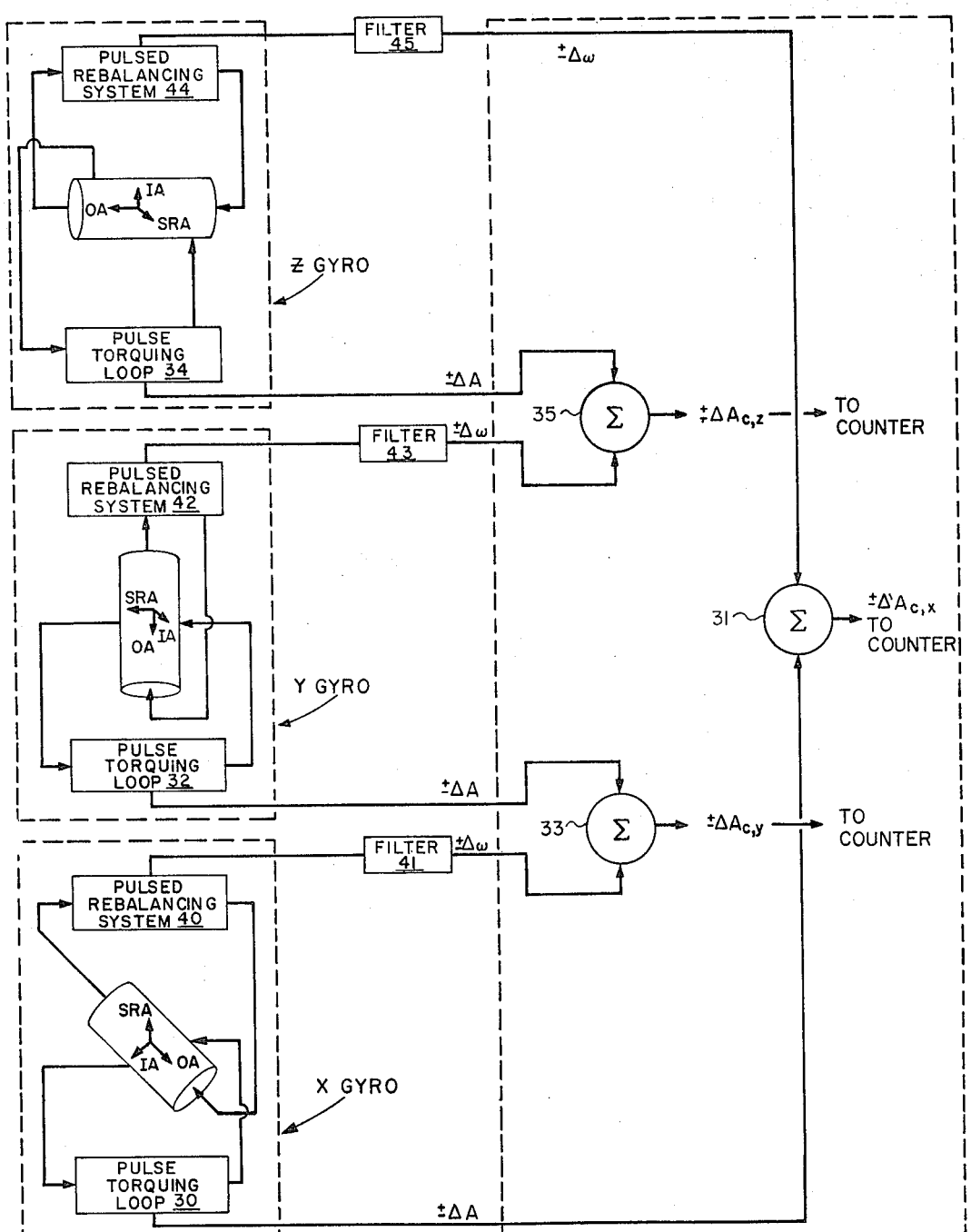
FIG. 3 is a functional block diagram showing the preferred alignment of the three system gyroscopes and the interconnection thereof in accordance with the invention.

The arrangement of the three system gyroscopes in accordance with the invention is shown in the block diagram of FIG. 3. Consider first the Y and Z gyros wherein the SRA of the Y gyro is aligned parallel to the OA of the Z gyro. Assume motion of the vehicle such as to impart a component of angular acceleration about the OA of the Z gyro and a component of angular velocity about the Z gyro's input axis. The total restoring torque generated by the Z gyro's pulse torquing loop 34 thus comprises a component due to the angular velocity about its input axis and a component of output axis torque. Consequently, the indicated output generated by pulse torquing loop 34 is in error. As noted in the figure, the output of loop 34 comprises quantized angular bits or pulses of driving current ($\pm\Delta A$), the pulses being of fixed magnitude and duration and the polarity of which indicates direction of float rotation. Simultaneously, the component of angular acceleration about the Z gyro is reflected as rotation about the spin reference axis of the Y gyro causing the pulsed rebalancing suspension system 42 of the Y gyro to impart a force such as to restore the float to its null or center position. As previously mentioned, the output of suspension system 42 is also in the form of pulses of driving current ($\pm\Delta\omega$), the pulses being of fixed magnitude and duration and having a polarity indicative of the direction of float rotation. (The term "polarity" applied to the suspension system pulses merely designates the particular readout circuit which generates each pulse. Here, the convention chosen is that pulses from summer 27A and its circuitry represent a positive polarity, while those from summer 28A and its circuitry represent a negative polarity.)

Further, the force applied by suspension system 42 to restore its float to null is directly and solely indicative of the rotation rate about the Y gyro's SRA, since rotation of a gyro's float about its SRA does not cause precession about any of the other axes of the gyro. As noted in FIG. 3 and in the mathematical development, the output from the pulsed rebalancing suspension system is directly indicative of rate and hence need not be differentiated.

Output pulses $\pm\Delta\omega$ from suspension system 42 are filtered via standard electronic filter 43 in order to match exactly the time constant of the output pulses with that of the output pulses $\pm\Delta A$ from pulse torquing loop 34. The two output signals are scaled (a scale factor of one is used in the preferred embodiment) and are algebraically summed in summer 35 within a transformation computer so as to produce a Z gyro output signal $\pm\Delta A_{c,z}$ which has been compensated for the error due to output axis torque. The compensated signal is fed to a counter, also in the transformation computer. (The counter is not shown.)

Compensation of the other system gyros is effected according to the procedure outlined above. Maintaining the example, motion of the base which resulted in the application of a component of angular velocity about the input axis of the Z gyro also generated a component of acceleration about the output axis of the Y gyro, causing an output axis torque within that gyro. Since the output axis of the Y gyro is aligned parallel with the SRA of the X gyro, this component of acceleration was also simultaneously reflected as rotation about the SRA of the X gyro. Accordingly, the Y gyro is compensated by comparing the output from its pulsed torquing loop 32 with the output from the pulsed rebalancing suspension system 40 about the SRA of the X gyro and proceeding as noted above.

Similarly, the X gyro is compensated for the effects of output axis torque since its output axis is aligned parallel with the spin reference axis of the Z gyro. Hence, the X gyro is compensated by comparing the output from its pulsed torquing loop 30 with the output from the suspension system 44 about the SRA of the Z gyro and, again, proceeding as above.

Single-degree-of-freedom gyroscopes are so designed that damping about the gyro's spin reference axis is appreciably higher than damping about the unit's output axis and the moment of inertia acting on the float during rotation about SRA is only slightly greater than the moment of inertia about the output axis. Consequently, the time constant for rotation about the gyro's SRA is considerably less than that for rotation about its OA. (The time constant, in standard gyroscope terminology, is defined as the time required by the float, upon the application of the transient torque or rate, to reach 67 percent of its steady-state value.) The shorter time constant about SRA, when properly filtered, coupled with the elimination of the necessity of differentiating the compensating signal allows immediately compensation and precludes the existence of a time lag between the error and the compensation therefor.

While a particular embodiment of the system has been described, the invention is not intended to be limited to those details. Various modifications may be made in the system and yet remain within the scope of the invention. Some of these moidfications are now discussed.

The transducer in the preferred embodiment of the pulsed rebalancing suspension system is described as inductive, but a capacitive device may also suit the purpose. In such a case, the mass would be fitted with capacitive surfaces that react with opposing ones in the transducer. An AC capacitive bridge would be formed to produce an output error signal whose phase and amplitude is indicative of deviation of the mass from the null position. The error voltage would conform to the well known capacitive equation relating voltage to the displacement of opposing capacitive surfaces. Standard electronic apparatus would generate voltage pulses required to suspend the mass. In this case, the corrective force is generated by voltage pulses rather than pulses of driving current. In any event, measurements may be implemented by indicating the readout apparatus similar to that described in the preferred embodiment.

Further, the pulsed torquing feedback loop about the gyro's output axis is not limited to the particular components described herein. Any configuration is suitable provided the output pulses generated thereby are of fixed magnitude and duration and indicate the direction and amount of float rotation about the output axis.

To cover these and other modifications, the scope of the invention is defined in the appended claims.

What is claimed is:

1. In an angular measuring unit including a first gyroscope having three mutually orthogonal axes designated as an input axis, an output axis, and a spin reference axis, and comprising a first means for generating a first output signal comprising a component of output axis torque due to angular acceleration of said first gyroscope about said output axis and a component of torque due to angular velocity of said first gyroscope about said input axis, gyroscopic apparatus for compensating said first output signal for said component of output axis torque, said gyroscopic apparatus comprising in combination;

(a) a second gyroscope having three mutually orthogonal axes designated as an input axis, an output axis, and a spin reference axis, and aligned relative to said first gyroscope such that said second gyroscope's spin reference axis is parallel with said first gyroscope's output axis, said second gyroscope further comprising a case and a float, said float having a first end mass and a second end mass, each of said end masses having a first side and a second side, and centered within said case so as to substantially preclude rotation of said float relative to said case about said second gyroscope's spin reference axis, and further comprising a second means generating a second output signal proportional to the rate of rotation of said float about said second gyroscope's spin reference axis; and (b) subtracting means coupled to said first and said second gyroscopes for subtracting said second output signal from said first output signal, thereby generating said compensated first output signal.

2. In an angular measuring unit including a first single-degree-of-freedom gyroscope having three mutually orthogonal axes designated as an input axis, an output axis, and a spin reference axis, and comprising a first means for generating a first output signal comprising a component of output axis torque due to angular acceleration of said first gyroscope about said output axis and a component of torque due to angular velocity of said first gyroscope about said input axis, gyroscopic apparatus for compensating said first output signal for said component of output axis torque, said gyroscopic apparatus comprising in combination;

(a) a second single-degree-of-freedom gyroscope having three mutually orthogonal axes designated as an input axis, an output axis, and a spin reference axis, and aligned relative to said first gyroscope such that said second gyroscope's spin reference axis is parallel with said first gyroscope's output axis, said second gyroscope further comprising a case and a float, said float having a first end mass and a second end mass, each of said end masses having a first side and a second side, and centered within said case so as to substantially preclude rotation of said float relative to said case about said second gyroscope's spin reference axis, and further comprising a second means generating a second output signal proportional to the rate of rotation of said float about said second gyroscope's spin reference axis; and (b) subtracting means coupled to said first and said second single-degree-of-freedom gyroscopes for subtracting said second output signal from said first output signal, thereby generating said compensated first output signal.

3. Gyroscopic apparatus of claim 2 wherein said second means for generating said second output signal is a time shared pulsed rebalancing magnetic suspension system coupled to said case and comprising a first feedback loop which generates pulses of driving power whenever said first float end mass deviates by a threshold value from said center position, a second feedback loop which generates pulses of driving power whenever said second float end mass deviates by a threshold value from said center position, and electronic readout means coupled to said first and said second feedback loops which generates said second output signal upon the application of said pulses of driving power from said first and said second feedback loops.

4. Gyroscopic apparatus of claim 3 wherein each of said feedback loops comprises in combination:

(a) a reference axis having said center position and first and second threshold positions, one on each side of said center position, and wherein one of said float end masses is substantially positioned within said reference axis aligned normally near said center position and between said first and second threshold positions;

(b) a bridge circuit having first and second output terminals and further comprising first and second reactive elements respectively coupled to said first and second terminals, said elements coacting respectively with the correspondingly numbered sides of said one of said float end masses so as to produce between said output terminals an error signal of a first polarity when said one of said float end masses crosses said first threshold position in the direction of said first reactive element, and a signal of a second polarity when said one of said float end masses crosses said second threshold position in the direction of said second reactive element;

(c) a sampler coupled to said output terminals for sampling and holding said error signal;

(d) a relay coupled to said sampler and to said output terminals, said relay applying said pulses of driving power to said first output terminal when said error signal is of said second polarity and applying said pulses of driving power to said second output terminal when said error signal is of said first polarity; and (e) a timing circuit coupled to said sampler emitting a sequence of timing signals comprising sample pulses with a repetition period $T_S$ and a series of reset pulses each of which succeeds a sample pulse after a delay $T_R$, and wherein said sample pulse activates said sampler to sample said error signal, and wherein said reset pulse activates said relay to terminate any driving power being applied to said output terminals of said circuit.

5. Gyroscopic apparatus of claim 4 wherein said electronic readout means coupled to said first and said second feedback lops comprises:

(a) a first summer for comparing said pulses of driving power applied to said first output terminal of said first feedback loop with said pulses of driving power applied to said second output terminal of said second feedback loop and generating a first difference signal of said second polarity;

(b) a second summer for comparing said pulses of driving power applied to said second output terminal of said first feedback loop with said pulses of driving power applied to said first output terminal of said second feedback loop and generating a second difference signal of said first polarity;

(c) a first apparatus for dividing by two said first difference signals;

(d) a second apparatus for dividing by two said second difference signal; and (e) a third summer for comparing said divided first difference signal with said divided second difference signal, and generating said second output signal having a polarity indicative of the direction of said float rotation.

6. Gyroscopic apparatus of claim 5 wherein said second output signal comprises pulses of driving power having a repetition rate $T_S$ and a width $T_R$.

7. Gyroscopic apparatus of claim 6 further comprising a filter for filtering said second output signal and for matching the time constant of said second output signal with the time constant of said first output signal.

8. An angular measuring unit for measuring rotation of a movable base relative to an inertial reference frame, said base having three mutually orthogonal axes, said measuring unit comprising in combination:

(a) a first single-degree-of-freedom gyroscope, a second single-degree-of-freedom gyroscope, and a third single-degree-of-freedom gyroscope, each of said gyroscopes having three mutually orthogonal axes designated as an input axis, an output axis, and a spin reference axis, said gyroscopes mounted rigidly on said base such that said input axis of each of said gyroscopes constitutes an axis of said base, and wherein said output axis of said first gyroscope is aligned parallel with said spin reference axis of said second gyroscope, said output axis of said second gyroscope is aligned parallel with said spin reference axis of said third gyroscope, and said output axis of said third gyroscope is aligned parallel with said spin reference axis of said first gyroscope, each of said gyroscope comprising a case and a float, said float having a first end mass and a second end mass, each of said end masses having a first side and a second side, and centered within said case so as to substantially preclude rotation of said float relative to said case about said gyroscope's spin reference axis, each of said gyroscopes further comprising a first means for generating a first output signal, said signal including a component of output axis torque due to angular acceleration of said gyroscope about said output axis and further including a component of torque due to the angular velocity of said gyroscope about said input axis, each of said gyroscopes further comprising a second means for generating a second output signal proportional to the rate of rotation of said float about said gyroscope's spin reference axis;

(b) subtracting means coupled to said first and said second gyroscopes for subtracting said second output signal of said second gyroscope from said first output signal of said first gyroscope, thereby compensating said first output signal of said first gyroscope for said component of output axis torque;

(c) subtracting means coupled to said second and said third gyroscopes for subtracting said second output signal of said third gyroscope from said first output signal of said second gyroscope, thereby compensating said first output signal of said second gyroscope for said component of output axis torque; and (d) subtracting means coupled to said third and said first gyroscopes for subtracting said second output signal of said first gyroscope from said first output signal of said third gyroscope, thereby compensating said first output signal of said third gyroscope for said component of output axis torque.

9. Gyroscopic apparatus of claim 8 wherein said second means for generating said second output signal is a time shared pulsed rebalancing magnetic suspension system coupled to said case and comprising a first feedback loop which generates pulses of driving power whenever said first float end mass deviates by a threshold value from said center position, a second feedback loop which generates pulses of driving power whenever said second float end mass deviates by a threshold value from said center position, and electronic readout means coupled to said first and said second feedback loops which generates said second output signal upon the application of said pulses of driving power from said first and said second feedback loops.

10. Gyroscopic apparatus of claim 9 wherein each of said feedback loops comprises in combination:

(a) a reference axis having said center position and first and second threshold positions, one on each side of said center position, and wherein one of said float end masses is substantially positioned within said reference axis aligned normally near said center position and between said first and second threshold positions;

(b) a bridge circuit having first and second output terminals and further comprising first and second reactive elements respectively coupled to said first and second terminals, said elements coacting respectively with the correspondingly numbered sides of said one of said float end masses so as to produce between said output terminals an error signal of a first polarity when said one of said float end masses crosses said threshold position in the direction of said first reactive element, and a signal of a second polarity when said one of said float end masses crosses said threshold position in the direction of said second reactive element;

(c) a sampler coupled to said output terminals for sampling and holding said error signal;

(d) a relay coupled to said sampler and to said output terminals, said relay applying said pulses of driving power to said first output terminal when said error signal is of said second polarity, and applying pulses of said driving power to said second output terminal when said error signal is of said first polarity; and (e) a timing circuit coupled to said sampler emitting a sequence of timing signals comprising sample pulses with a repetition period $T_S$ and a series of reset pulses each of which succeeds a sample pulse after a delay $T_R$, and wherein said sample pulse activates said sampler to sample said error signal, and wherein said reset pulse activates said relay to terminate any driving power being applied to said output terminals of said circuit.

11. Gyroscopic apparatus of claim 10 wherein said electronic readout means coupled to said first and said second feedback loops comprises:

(a) a first summer for comparing said pulses of driving power applied to said first output terminal of said first feedback loop with said pulses of driving power applied to said second output terminal of said second feedback loop and generating a first difference signal of said second polarity;

(b) a second summer for comparing said pulses of driving power applied to said second output terminal of said first feedback loop with said pulses of driving power applied to said first output terminal of said second feedback loop and generating a second difference signal of said first polarity;

(c) a first apparatus for dividing by two said first difference signal;

(d) a second apparatus for dividing by two said second difference signal; and (e) a third summer for comparing said divided first difference signal with said divided second difference signal, and generating said second output signal having a polarity indicative of the direction of said float rotation.

12. Gyroscopic apparatus of claim 11 wherein said second output signal comprises pulses of driving power having a repetition rate $T_S$ and a width $T_R$.

13. Gyroscopic apparatus of claim 12 further comprising a filter for filtering said second output signal and for matching the time constant of said second output signal with the time constant of said first output signal.

14. Gyroscopic apparatus of claim 4 wherein both said float and said suspension system have three mutually orthogonal axes, both designated as $x$, $y$, and $z$ axes, and wherein when said float is centered within said case so as to substantially preclude rotation of said float relative to said case about said second gyroscope's spin reference axis, said $x$, $y$, and $z$ axes of said float substantially coincide with said $x$, $y$, and $z$ axes respectively of said suspension system and with said input, spin reference, and output axes respectively of said second gyroscope, and further wherein said reference axis having said center position substantially coincides with said $x$ axis of both said float and said suspension system.

15. Gyroscopic apparatus of claim 10 wherein both said float and said suspension system for each of said gyroscopes have three mutually orthogonal axes, all designated as $x$, $y$, and $z$ axes, and wherein when, for each of said gyroscopes, said float is centered within said case so as to substantially preclude rotation of said float relative to said case about said gyroscope's spin reference axis, said $x$, $y$, and $z$ axes of said float substantially coincide with said $x$, $y$, and $z$ axes respectively of said suspension system and with said input, spin reference, and output axes respectively of said gyroscope, and further wherein said reference axis, having said center position, substantially coincides with said $x$ axis of both said float and said suspension system for each of said gyroscopes.

References Cited

UNITED STATES PATENTS

| | | | |
|---|---|---|---|
| 3,229,534 | 1/1966 | Ashby | 74—5.34 |
| 3,352,164 | 11/1967 | Rosen | 74—5.34 |
| 3,349,630 | 10/1967 | Seliger et al. | 74—5.34 |
| 3,355,954 | 12/1967 | Levine et al. | 74—5.34 |

FRED C. MATTERN, Jr., Primary Examiner

M. ANTONAKAS, Assistant Examiner

U.S. Cl. X.R.

74—5